United States Patent [19]
Eberle

[11] Patent Number: 5,924,744
[45] Date of Patent: Jul. 20, 1999

[54] PIPE COUPLING

[76] Inventor: Gerald P. Eberle, 200 Oxford Way, Belmont, Calif. 94002

[21] Appl. No.: 08/911,425

[22] Filed: Aug. 14, 1997

Related U.S. Application Data

[60] Provisional application No. 60/024,615, Aug. 26, 1996.

[51] Int. Cl.[6] ..................................................... F16L 37/20
[52] U.S. Cl. .......................... 285/81; 285/311; 285/320; 285/179
[58] Field of Search .................................... 285/179, 312, 285/320, 81, 87, 88, 311

[56] References Cited

U.S. PATENT DOCUMENTS

| | | | |
|---|---|---|---|
| 3,442,535 | 5/1969 | Frohlich | 285/320 |
| 3,489,434 | 1/1970 | Haley | 285/311 |
| 3,494,641 | 2/1970 | Caregnato | 285/320 |
| 4,142,740 | 3/1979 | Wilms | 285/320 |
| 4,599,936 | 7/1986 | Doll et al. | 285/320 |
| 4,623,172 | 11/1986 | Shepheard | 285/309 |
| 5,005,876 | 4/1991 | Fahl | 285/311 |
| 5,355,917 | 10/1994 | Kofflin | 141/384 |

*Primary Examiner*—Eric K. Nicholson

[57] ABSTRACT

A pipe coupling (20) for applications including, but not limited to, connecting a conduit to a cooperating fitting (28) on an aircraft. Particularly a pipe coupling (20) incorporating slot fill dowels (36). The dowels (36) provide obstruction to inadvertent separation of the coupling (20) from the cooperating flange (28) while all fastening devices are engaged. The coupling (20) additionally may include an elbow (26) allowing various radial conduit positions.

14 Claims, 3 Drawing Sheets

COUPLING SIDE VIEW

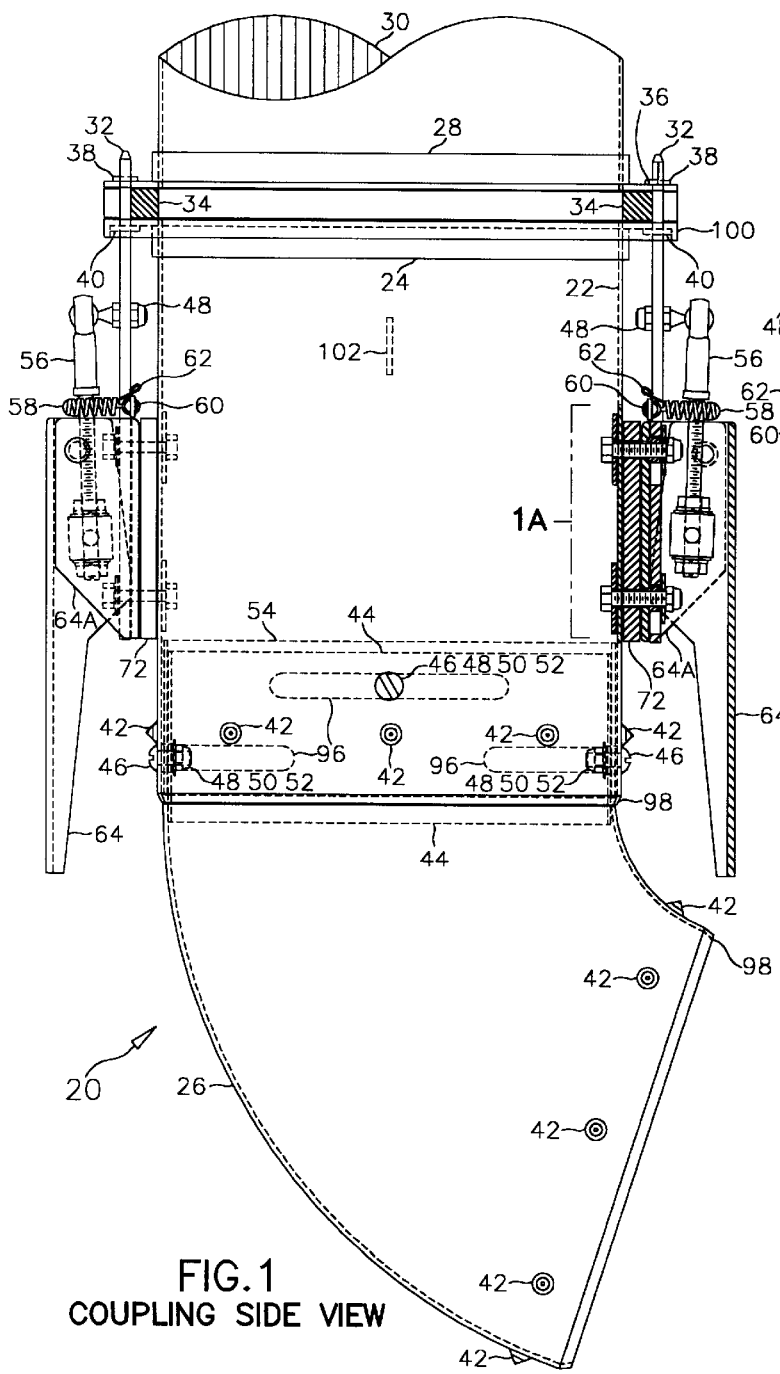
FIG. 1
COUPLING SIDE VIEW
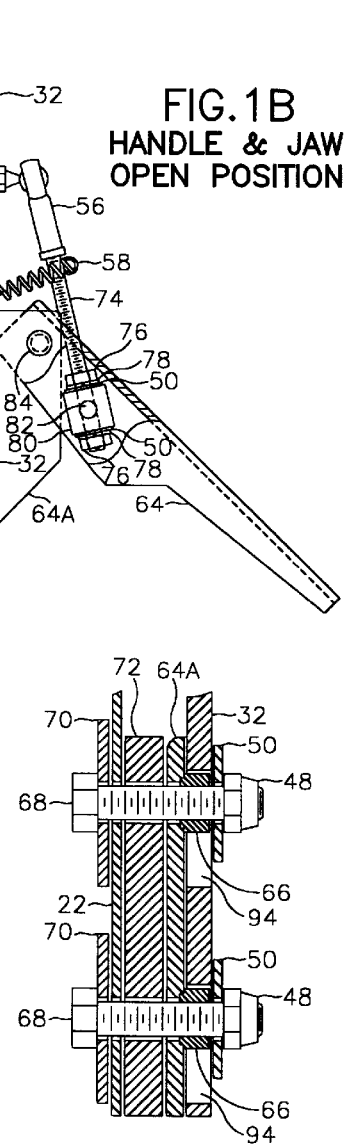
FIG. 1B
HANDLE & JAW OPEN POSITION
FIG. 1A
HANDLE/JAW MOUNT SECTION

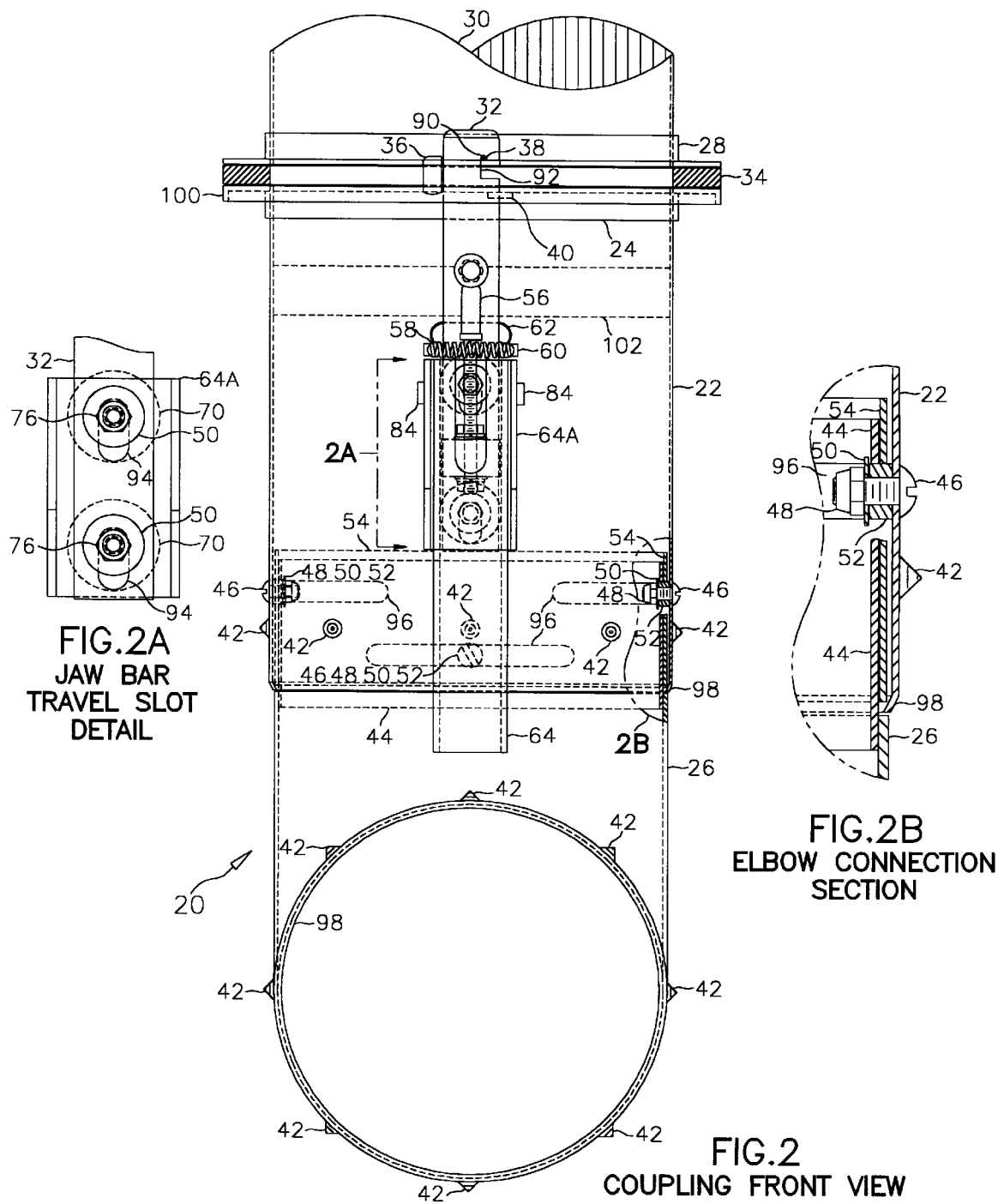

COUPLING FLANGE SLOT

ADJOINING FLANGE SLOT

COUPLING FLANGE SLOT
SECTION

ADJOINING FLANGE SLOT
SECTION

JAW BAR ADVANCED

JAW BAR
UPPER END

JAW BAR
TOP EDGE

JAW BAR INSERTED

JAW LATCHED

PIPE COUPLING

CROSS REFERENCES TO RELATED APPLICATIONS

This application claims the benefit of Provisional patent application Ser. No. 60/024,615, filed Aug. 26, 1996.

BACKGROUND

1. Field of Invention

This invention relates to aircraft ground support, specifically an improved pipe coupling that connects a pre-conditioned air conduit to a parked aircraft.

BACKGROUND

2. Description of Prior Art

Aircraft parked on an airport ramp usually require a means of controlling temperature and humidity of the aircraft cabin. Ground equipment that supports this requirement provides Pre-Conditioned Air (PCA) to an aircraft via a large hose (PCA conduit).

The present method of connecting a PCA conduit to an aircraft, or sometimes other ground support equipment, is by the use of a flanged pipe coupling or chute (PCA connector). A worker manually secures the PCA connector to a compatible PCA flange on the aircraft. Although flexible when idle, the conduit inflates and becomes rigid when the PCA system is operating. This rigidity, plus the effort of the PCA conduit to straighten itself when pressurizing, imparts considerable stress to the PCA connector.

Inadequate attachment of the PCA connector to the aircraft causes inadvertent separation of the PCA connector from the aircraft. Should the PCA system be operating (pressurized) when separation occurs, there will be dangerous, uncontrollable movement of the PCA conduit and PCA connector.

The present PCA connectors used to connect PCA conduits to aircraft and other ground support equipment have several significant disadvantages.

Shepheard, in U.S. Pat. No. 4,623,172 (1986), shows a device described as a "pipe coupling" (PCA connector). Shepheard's attaching method requires that the handle employed to operate the PCA connector's latches must simultaneously be used to position the PCA connector. The twofold operation often causes premature latch closure. The additional work necessary to release and re-connect is inconvenient and frustrates the worker's effort to complete a safe coupling.

Kofflin, in U.S. Pat. No. 5,355,917 (1994), shows a device described as a "PCA adapter chute" (PCA connector). Kofflin's device necessitates that a worker, after positioning the device against the aircraft PCA flange, let go of the support handles and then operate the PCA connector's separate latch handles. This operation often results in connector separation, causing inconvenience and frustration of the worker's effort to complete a safe coupling. Further, Kofflin's device has no means of preventing inadvertent rotation and disengagement from the aircraft PCA flange while the PCA system is pressurized. Further, the hooks on Kofflin's device are easily deformed in normal use, Further, Kofflin's device, being of plastic material, is subject to becoming brittle during normal use in low temperature environments.

Both Shepheard's and Kofflin's PCA connectors lack the ability of their operating mechanisms to reliably latch, as the mechanisms are dependent on the condition of a consumable foam rubber gasket. Finally, each of their devices lack the ability to allow the attached PCA conduit to rotate into a minimum stress position, thus encouraging stress on the PCA connector, kinks in the PCA conduit, inefficient PCA flow, and significant wasted energy.

OBJECTS AND ADVANTAGES

Accordingly, several objects and advantages of my pipe coupling are:

(a) to provide a pipe coupling employing a tube or combination of tubes, one end of which is equipped with flange and pair of bars incorporating hooks or jaws, these hooks or jaws engaging slots in a cooperating flange;

(b) to provide a pipe coupling, wherein an end opposite the flange end is capable of receiving and retaining a conduit;

(c) to provide handle levers that in one position maintain the jaw bars in full open or maximum position and, in an alternate position, maintain the jaw bars in closed or minimal position;

(d) to provide handle levers that, in addition to operating the jaw bars, provide large mechanical advantage for positioning or removing the pipe coupling while simultaneously emaintaining the jaw bars in full open or maximum position;

(e) to provide handle levers that, while moving the jaw bars, impart straight line motion to the jaw bars with tremendous mechanical advantage;

(f) to provide handle levers that will maintain the jaw bars in closed or minimal position without depending on tension brought by gasket compression;

(g) to provide each hook or jaw as an integral part of a flat bar without bends or offsets, the design of which precludes deformation of jaw or bar by applied forces;

(h) to provide each hook or jaw with a recess or cleat receiver positioned such that the cleat receiver encompasses a cleat on the edge of each slot in the cooperating flange;

(i) to provide a pipe coupling that provides a means to completely occupy the length of each slot in the cooperating flange;

(j) to provide a pipe coupling, the flange of which incorporates slot fill dowels which, when engaged to the cooperating flange, positively prevent flange rotation and inadvertent coupling separation;

(k) to provide a pipe coupling incorporating a means of permitting an attached conduit to achieve a variable take off angle, thus reducing coupling stress and conduit kinking caused by conduit misalignment and allowing improved flow efficiency;

(I) to provide a pipe coupling, wherein the tube end opposite the flange end is optionally provided with a separable tube in the form of an elbow, the deletion thereof not impairing the ability of the straight coupling section to function alone if necessary;

(m) to provide a pipe coupling, wherein the tube end opposite the flange end is optionally provided with a separable tube in the form of an elbow, the tube and elbow joint incorporating the ability to swivel, thus providing variable radial take off angle of an attached conduit and permitting conduit self-alignment when pressurizing;

(n) to provide a device with attachment hooks or jaws that will withstand the rigors of every day use;

(o) to provide a pipe coupling unaffected by usage in environmental temperature extremes.

Further objects and advantages are to provide a pipe coupling which is readily accepted by the personnel applying the device, which provides mechanical efficiency and may be properly applied in the time allotted, which improves operating efficiency of high energy usage equipment that supports aircraft on the ground, and which meets the extreme durability requirements of the aircraft ground support environment. Still further objects and advantages will become apparent from a consideration of the ensuing description and accompanying drawings.

BRIEF DESCRIPTION OF THE DRAWINGS

FIG. 1 shows a side view of the pipe coupling mated to an adjoining flange.

FIG. 1A shows an expanded view of a method of fastening a handle assembly and jaw bar to the pipe coupling straight tube.

FIG. 1B shows shows-the position change of a handle lever and jaw bar in the open or un-latched position. Mounting details are omitted.

FIG. 2 shows a front view of the pipe coupling mated to an adjoining flange.

FIG. 2A shows an expanded view of travel slots in a jaw bar.

FIG. 2B shows an expanded view of elbow-to-tube connection.

REFERENCE NUMERALS

Figure 3A:
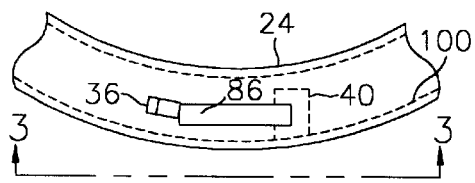
FIG. 3A shows a view of a slot area on the mating surface of a coupling flange.

| | |
|---|---|
| 20 pipe coupling | 64 handle lever |
| 22 straight tube | 64A handle base |
| 24 coupling flange | 66 self clinching nut |
| 26 moveable elbow | 68 bolt |
| 28 adjoining or cooperating flange | 70 large diameter flat washer |
| 30 adjoining conduit or pipe | 72 spacer |
| 32 jaw bar | 74 connecting rod |
| 34 gasket | 76 nut |
| 36 slot fill dowel | 78 lock washer |
| 38 slot edge cleat | 80 support block |
| 40 jaw bar guide | 82 gudgeon dowel |
| 42 clamp retaining projection | 84 rivet |
| 44 elbow extension | 86 coupling flange slot |
| 46 screw | 88 adjoining flange slot |
| 48 lock nut | 90 cleat receiver |
| 50 flat washer | 92 jaw |
| 52 bushing | 94 jaw bar travel slot |

-continued

REFERENCE NUMERALS

| | |
|---|---|
| 54 sleeve bearing | 96 elbow travel slot |
| 56 ball joint rod end | 98 chamfer |
| 58 helical tension spring | 100 reinforcing lip |
| 60 spring retaining bar | 102 lifting bar appurtenance |
| 62 spring safety cable | |

SUMMARY

In accordance with the present invention, a pipe coupling comprises a flanged tube for the purpose of connecting a conduit to a cooperating flange. The coupling incorporates interference devices which prevent inadvertent separation of the coupling from the cooperating flange while the coupling fastening devices are engaged. The coupling additionally may include a tube section allowing various angles of approach of the conduit to the connection point.

DESCRIPTION—FIGS. 1 to 6A

FIG. 1 (side view) and FIG. 2 (front view) illustrate the preferred embodiment of a pipe coupling 20 mated to an adjoining or cooperating flange 28.

A straight tube 22 has a coupling flange 24 attached to or formed on one end. A gasket 34, of annular shape, is attached to the mating face of coupling flange 24. The mating face of coupling flange 24 (FIGS. 3 & 3A) has a pair of coupling flange slots 86 and a pair of slot fill dowels 36, one of each provided at locations 180 degrees opposite on the same diameter centerline.

Coupling flange slots 86 correspond exactly to adjoining flange slots 88 (FIGS. 4 & 4A) on adjoining flange 28. As the components involved with flange coupling are identical on both sides of FIG. 1, details will be provided for one side only.

Slot fill dowel 36 (FIGS. 3 & 3A) provides a method of filling the entire adjoining flange slot 88 (FIGS. 4 & 4A) when a jaw bar 32 (FIGS. 5, 5A & 5B), incorporating a jaw 92 (FIG. 6) is inserted, slightly rotated, retracted, and latched. Once slot fill dowel 36 is in place, pipe coupling 20 cannot be removed unless jaw bar 32 is moved to the un-latched position. Correct positional relationship permits the rectangular shape of slot fill dowel 36 (FIG. 3A) and modified rectangular shape of the upper end of jaw bar 32 (FIGS. 6 & 6A) to engage adjoining flange slot 88 (FIGS. 4 & 4A), which is curved.

A slot edge cleat 38 (FIGS. 4 and 4A) is provided at one end of adjoining flange slot 88. A cleat receiver 90, located in jaw 92 (FIG. 5B) encompasses slot edge cleat 38 when jaw 92 is latched or closed. Jaw bar 32 (FIG. 1 B) is moved in a straight line by a handle lever 64. Handle lever 64 is connected to jaw bar 32 by pivoting linkage. This linkage consists of a ball joint rod end 56, a lock nut 48, a connecting rod 74, a support block 80, and in pairs, a gudgeon dowel 82, a nut 76, a flat washer 50, and a lock washer 78. Handle lever 64 is secured to a handle base 64A at two places by a rivet 84. The rotational center for handle lever 64 (FIG. 1B) is rivet 84. Moving handle lever 64 away from straight tube 22 causes support block 80 to move forward. The linkage will then cause jaw bar 32 to move forward in a straight line. Continued forward motion of support block 80 will cause jaw bar 32 to extend to the limit allowed by a jaw bar travel slot 94 (FIGS. 1A, 2 & 2A). A jaw bar guide 40 (FIGS. 3A & 5) reinforces the position of the leading edge of jaw bar 32 (FIG. 5). Adjacent FIGS. 1 & 1B identify the relative difference in jaw bar 32 location between un-latched position (FIGS. 1B & 5A) and latched position (FIGS. 1 & 5B). The exact position of jaw bar 32 (FIG. 1 & 1B) when in the closed or latched position is determined by the effective length of connecting rod 74. This length is adjusted by moving the position of support block 80 along a section of connecting rod 74. Support block 80 (FIG. 1B) is secured in final position by tightening nut 76 with lock washer 78 on both sides of support block 80.

When handle lever 64 (FIG. 1) is in the fully closed position and pipe coupling 20 is connected to an adjoining flange 28, connecting rod 74 enjoys considerable tension. The direction of tension is such that handle lever 64 tries to continue to rotate about rivets 84, toward the closed position. Thus, support block 80 is pulled towards handle base 64A, keeping handle lever 64 firmly in the closed position.

Handle base 64A (FIG. 1A), is modified by the installation of a self clinching nut 66 at two positions. Self clinching nut 66 functions both as a fastener for handle base and as a bushing for jaw bar travel slot 94 (FIG. 1A). Handle base 64A and a spacer 72 (FIGS. 1 & 1A) are secured to straight tube 22 at two positions by a bolt 68, a large diameter flat washer 70, and self clinching nut 66. Jaw bar 32 (FIG. 1A) is attached to handle base 64A at two positions by lock nut 48 and flat washer 50. Handle lever 64 and handle base 64A combined are old mechanical concepts.

A helical tension spring 58 (FIGS. 1, 1B and 2) is held by a spring retaining bar 60. Spring retaining bar 60 (FIG. 2) extends past both sides of jaw bar 32 and engages the loops on the ends of helical tension spring 58. A spring safety cable 62 (FIGS. 1, 1B and 2) is routed through helical tension spring 58 and around jaw bar 32.

A moveable elbow 26 (FIGS. 1 & 2) is positioned at the end of straight tube 22 by an elbow extension 44. Elbow extension 44 (FIGS. 1, 2 & 2B) is secured to straight tube 22 at four positions by a screw 46, a bushing 52, a flat washer 50, and a lock nut 48. A sleeve bearing 54 (FIG. 2B) is installed between elbow extension 44 and straight tube 22. Sleeve bearing 54, comprised of a formed strip of material, is secured in place by the incorporation of holes positioned in sleeve bearing 54. These holes fit over bushings 52 (FIGS. 2 & 2B) at four locations. The material comprising sleeve bearing 54 must be softer than elbow extension 44 and provide appropriate lubricity.

DESCRIPTION—FIGS. 1 to 6A

Elbow extension 44 (FIGS. 1, 2 & 2B) rotates to limits imposed by an elbow travel slot 96 at four locations. Elbow extension 44 has two pairs of elbow travel slots 96, each pair is on its own level with pair halves opposed 180 degrees. Each elbow travel slot 96 encompasses its own bushing 52. Bushing 52 is so located that it is in the center of elbow travel slot 96 when elbow travel slot 96 is in mid-rotation position.

A clamp retaining projection 42 (FIGS. 1 & 2) is provided in a radial pattern near the open end of moveable elbow 26. The purpose of clamp retaining projection 42 is to keep a clamping device and clamped conduit in the proper position. A chamfer 98 (FIG. 1) is provided at the opening of moveable elbow 26. A reinforcing lip 100 (FIG. 1) may be provided on coupling flange 24. Reinforcing lip 100 will enhance the mating face rigidity of coupling flange 24.

An alternate embodiment of pipe coupling 20 deletes moveable elbow 26, elbow extension 44, sleeve bearing 54, and associated fastening hardware. Use of pipe coupling 20 in the alternate embodiment is facilitated by clamp retaining projection 42 and chamfer 98 (FIGS. 1 & 2) on straight tube 22. Chamfer 98 eases the installation of an object on moveable elbow 26 or straight tube 22.

An appurtenance in the form of a bar or rod (FIGS. 1 & 2) is provided within straight tube 22 and may be used as a lifting bar 102 for attachment of a lifting device.

Selection of materials used in the construction of pipe coupling 20 is determined by application. For instance, applications involving corrosives may call for all synthetic (plastic) or stainless steel construction, whereas an application requiring minimum weight may call for aluminum or titanium construction.

OPERATION—FIGS. 1 to 6A

The application and use of pipe coupling 20 (FIGS. 1 & 2)) is consistent with that of many pipe couplings in present use. That is, one grips a pipe coupling, places it against a compatible mating device, and achieves attachment by a mechanical operation.

The design of the preferred embodiment of pipe coupling 20 (FIG. 1) requires the operator to hold the device by gripping handle levers 64. As the pipe coupling is moved near to the point of connection, the operator determines an optimum rotational position for moveable elbow 26. The operator adjusts the elbow position accordingly, then moves handle levers 64 to their outermost or fully extended position (FIG. 1B). The result of handle levers 64 outward movement is twofold. First, jaw bars 32 extend to the open or unlatched position (FIG. 1B). Second, the outward position of handle levers 64 provides a large mechanical advantage from which to manipulate pipe coupling 20.

Figure 4A:
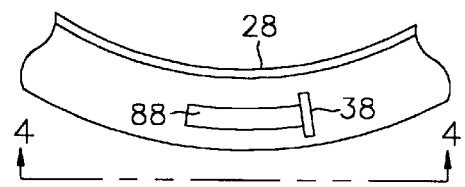
FIG. 4A shows a view of a slot area on the back surface of an adjoining flange.
Figure 3:
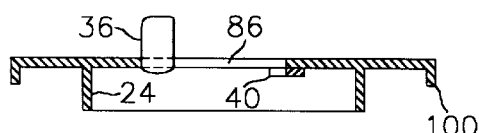
FIG. 3 shows a section view of a slot on a coupling flange.
Figure 4:
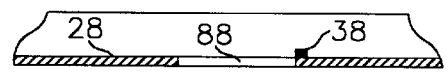
FIG. 4 shows a section view of a slot area of an adjoining flange.
Figure 5A:
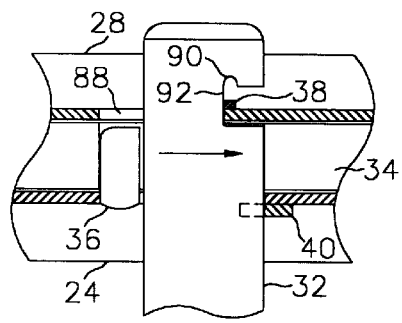
FIG. 5A shows a jaw bar and jaw in the advanced or open position (most hidden lines removed for clarity).
Figure 6:
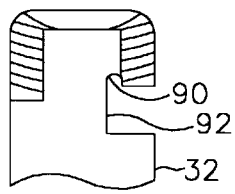
FIG. 6 shows a side view of the outside of the upper end of the jaw bar.
Figure 6A:
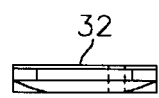
FIG. 6A shows a top view of the jaw bar.
Figure 5:
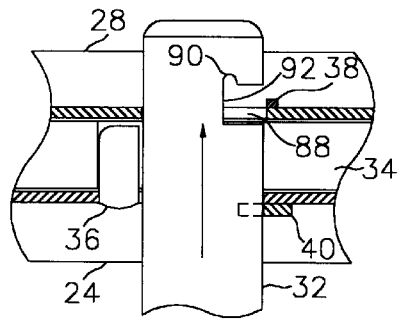
FIG. 5 shows a jaw bar inserted into an adjoining flange slot (most hidden lines removed for clarity).
Figure 5B:
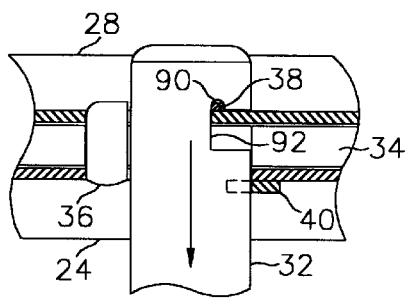
FIG. 5B shows a jaw bar and jaw in the latched or closed position with gasket compressed (most hidden lines removed for clarity).

The operator next inserts both jaw bars 32 into adjoining flange slots 88 (FIGS. 4A & 5). While applying pressure on handle levers 64 towards adjoining flange 28, pipe coupling 20 is rotated slightly. This rotation advances jaw bars 32 and jaws 92 (FIG. 5A) such that the inside edges of jaws 92 abut slot edge cleats 90 on adjoining flange 28. At this time, the operator will determine, by resistance to further rotation, that jaws 92 have advanced as far as possible. The operator then moves handle levers 64 toward straight tube 22 until seated against handle bases 64A (FIGS. 1 & 2). This action retracts jaw bars 32 and jaws 92 to their fully closed or latched position (FIGS. 2 & 5B). Three actions occur simultaneously as jaw bars 32 are retracting (FIGS. 5, 5A & 5B). First, slot fill dowels 36 are moving into position in adjoining flange slots 88. Second, gasket 34 is being compressed to effect a seal. Third, cleat receivers 90, within jaws 92, are moving to encompass slot edge cleats 38. Once the fully latched position is achieved (FIGS. 1, 2 & 5B), pipe coupling 20 cannot be disengaged without deliberate action.

Redundant methods of positive retention are employed. First, the presence of slot fill dowels 36, within adjoining flange slots 88, positively obstruct backward movement of jaws 92. Second, engaged slot edge cleats 38 and cleat receivers 90, at adjoining flange slots 88, positively prevent backward movement of jaws 92. When handle levers 64 are fully seated against handle bases 64A (FIG. 1), support blocks 80 are in an over center position. In this position, tension on connecting rods 74, caused by compression of gasket 34, holds handle levers 64 closed with considerable force. Demounting pipe coupling 20 requires exactly the reverse of the installation procedure.

Helical tension springs 58 (FIGS. 1 & 1B) maintain handle levers 64 in the closed position when pipe coupling 20 is not in use. Spring safety cables 62 (FIGS. 1B & 2) retain helical tension springs 58 should the springs become disengaged from spring retaining bars 60.

OPERATION—FIGS. 1 to 6A

Should moveable elbow 26 (FIG. 1) not be required, the elbow and its attaching components may be deleted at the operators discretion.

Clamp retaining projections 42 (FIG. 1) have been provided in a radial pattern at two locations. The first location is at the open end of moveable elbow 26. The second location is at the end of straight tube 22, adjacent to moveable elbow 26. A circumferential band type clamp at either of these locations will not be permitted to slip past clamp retaining projections 42.

An appurtenance which may be used as a lifting bar 102 (FIGS. 1 & 2) is available for the attachment of a lifting device.

CONCLUSIONS, RAMIFICATIONS, AND SCOPE

By the above descriptions and drawings it can be seen that, according to the invention, a durable pipe coupling is provided which may be applied in a simple, effective manner while at the same time enhancing safety and energy efficiency. As shown, it is able to effectively eliminate inadvertent separation of the coupled connection when the normal fastening devices are engaged. Such separation is possible on existing designs not resistant to external stresses and wear in the mating flange. As stated, it will allow the approach angle of a conduit to vary in a manner to best accommodate a particular connection.

Although the description above contains many specificities, these should not be construed as limiting the scope of the invention but as merely providing illustrations of some of the presently preferred embodiments of this invention. Various other embodiments and ramifications are possible within it's scope. For example, the pipe coupling may be used to connect one section of conduit to another, the other conduit section being equipped with a compatible coupling. Another example would be the connection of the coupling to a compatible plate or bulkhead as might be found on a piece of equipment. Another possibility is the use of the coupling not as a pipe coupling, but rather as a safe and sound means of rapid mechanical attachment of objects unrelated to conduits. Thus the scope of the invention should be determined by the appended claims and their legal equivalents, rather than by the examples given.

I claim:

1. A coupling for separably connecting a conduit to an adjoining, cooperating flange, said coupling comprising:

a tube of cylindrical form, one end of said tube supporting a coupling flange, a distal end of said tube for receiving and retaining said conduit, a plurality of jaw bars axially positioned on sides of said tube, an end of each of said jaw bars and incorporating a hook or jaw, each of said hooks or jaws opening toward the front edge of an associated said jaw bar, wherein said said hooks or jaws project slidably past said coupling flange into a plurality of corresponding slots in said cooperating flange, a plurality of handle levers for axial movement of said jaw bars and rotational movement of said coupling, said handle levers attached to said tube and incorporating linkages to said jaw bars, an engagement of said hooks or jaws caused by slight axial rotation of said jaw hooks within said corresponding slots, wherein the connection is completed by axial retraction of said jaw bars, said handle levers also providing separation in the opposite order of connection, said handle levers offering substantial mechanical advantage, a plurality of slot fill dowels, said slot fill dowels fixed to said coupling flange and abutting rear edges of respective said jaw bars, wherein said slot fill dowels are, during the connection process, progressively urged into said corresponding slots during retraction of said jaw bars, wherein said slot fill dowels and said jaws or hooks co-occupy said corresponding slots, thus providing obstruction to counter rotation of said coupling, thereby preventing disengagement of retracted said jaw bars from said cooperating flange, a restraint for urging said handle levers to remain at closed or minimal position while said coupling is connected to said cooperating flange, whereby, said coupling provides for highly reliable, efficient, durable, and separable connection of said conduit to said cooperating flange.

2. A coupling as in claim 1, wherein said plurality of jaw bars is including two of said jaw bars, said jaw bars disposed on opposite sides of said tube on axis of said coupling flange, each of said jaw bars projecting slidably through a respective slot in said coupling flange into said corresponding slots in said cooperating flange, said plurality of handle levers is a pair of handle levers attached to said tube, said handle levers slidably encompassing respective said jaw bars and enabling axial movement thereof, means for over center latching of said handle levers and said jaw bars, wherein tension brought by said jaw bars and said linkages urges said handle levers to remain at closed position, an independent means for urging said handle levers and said jaw bars toward closed position, said independent means not related to tension on said jaw bars.

3. A coupling as in claim 1, said coupling flange supporting a facial gasket thereon.

4. A coupling as in claim 2, said coupling flange supporting said facial gasket thereon and further, supporting a reinforcing lip about the circumference of said coupling flange, said reinforcing lip disposed toward said distal end of said coupling flange.

5. A coupling as in claim 2, wherein the independent means for urging each of said handle levers and each of said jaw bars toward closed or minimal position each comprises a helical tension spring, a spring retaining bar and a safety cable loop through said spring.

6. A coupling as in claim 4, wherein the independent means for urging each of said handle levers and each of said jaw bars toward closed or minimal position each comprises said helical tension spring, said spring retaining bar and said safety cable loop through said spring.

7. A coupling as in claim 6, wherein said distal end of said tube adjoins an additional tube, said additional tube being an elbow, said elbow having an elbow extension and said end for receiving and retaining said conduit, said elbow allowing the axis of said conduit to be positioned other than in line with the axis of said coupling flange.

8. A coupling as in claim 7, wherein said elbow and said elbow extension are separable from said end of said tube such that said coupling remains complete and independently functional, absent said elbow.

9. A coupling as in claim 8, wherein said elbow includes a sleeve bearing interposed between said elbow extension and said tube.

10. A coupling as in claim 1, wherein an appurtenance is provided within said coupling, such that a lifting device maybe attached to said coupling.

11. A coupling as in claim 3, wherein an appurtenance is provided within said coupling such that a lifting device may be attached to said coupling.

12. A coupling as in claim 6, wherein an appurtenance is provided within said coupling such that a lifting device may be attached to said coupling.

13. A coupling as in claim 7, wherein an appurtenance is provided within said coupling such that a lifting device may be attached to said coupling.

14. A coupling as in claim 9, wherein an appurtenance is provided within said coupling such that a lifting device may be attached to said coupling.

* * * * *

UNITED STATES PATENT AND TRADEMARK OFFICE
CERTIFICATE OF CORRECTION

PATENT NO. : 5,924,744
DATED : July 20, 1999
INVENTOR(S) : Gerald P. Eberle

It is certified that error appears in the above-identified patent and that said Letters Patent is hereby corrected as shown below:

Col. 2, line 26, change "emaintaining" to —maintaining—.

Col. 3, line 21, FIG. 1B, change "shows shows-" to —shows—.

CLAIMS:

Claim 1, Col. 7, line 59, after "associated" delete—said—.

line 60, after "wherein" change "said said" to —said—.

Claim 1, Col. 8, line 17, delete "or minimal".

Claim 2, Col. 8, line 22, after "bars is" delete—including—.

Claim 5, Col. 8, line 47, after "closed" delete—or minimal—.

line 47, after "position" delete—each—.

Claim 6, Col. 8, line 52, after "closed" delete—or minimal—.

line 52, after "position" delete—each—.

Signed and Sealed this

Fourth Day of January, 2000

Attest:

Attesting Officer

*Acting Commissioner of Patents and Trademarks*